United States Patent
Wang et al.

(10) Patent No.: US 10,732,703 B2
(45) Date of Patent: Aug. 4, 2020

(54) APPARATUS AND METHOD FOR REDUCING AN ENERGY CONSUMPTION OF HARDWARE BASED ON AN APPLICATION STATE

(71) Applicant: Futurewei Technologies, Inc., Plano, TX (US)

(72) Inventors: Jun Wang, Santa Clara, CA (US); Handong Ye, Sunnyvale, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/448,396

(22) Filed: Mar. 2, 2017

(65) Prior Publication Data

US 2018/0253139 A1 Sep. 6, 2018

(51) Int. Cl.
G06F 1/26 (2006.01)
G06F 1/32 (2019.01)
G06F 1/3296 (2019.01)
G06F 1/329 (2019.01)
G06F 1/324 (2019.01)
G06F 1/3206 (2019.01)

(52) U.S. Cl.
CPC ............ G06F 1/3296 (2013.01); G06F 1/324 (2013.01); G06F 1/3206 (2013.01); G06F 1/329 (2013.01)

(58) Field of Classification Search
CPC ........................................................ G06F 1/32
See application file for complete search history.

(56) References Cited

U.S. PATENT DOCUMENTS

| | | | |
|---|---|---|---|
| 7,272,730 B1 | 9/2007 | Acquaviva et al. | |
| 8,230,169 B2* | 7/2012 | Inoue | G01K 1/026 711/112 |
| 9,423,847 B2* | 8/2016 | Branover | G06F 1/3206 |
| 2003/0226047 A1 | 12/2003 | Park et al. | |
| 2009/0031268 A1 | 1/2009 | Miranda et al. | |
| 2010/0162006 A1* | 6/2010 | Therien | G06F 1/3203 713/300 |
| 2013/0166900 A1 | 6/2013 | Noro | |

(Continued)

FOREIGN PATENT DOCUMENTS

| | | |
|---|---|---|
| CN | 101101504 A | 1/2008 |
| CN | 101201689 A | 6/2008 |
| CN | 103475790 A | 12/2013 |

OTHER PUBLICATIONS

Pallipadi et. al., "The ondemand governor, past, present, and future," Proceedings of the Linux Symposium, 2006, pp. 215-230.

(Continued)

*Primary Examiner* — Mohammed H Rehman
(74) *Attorney, Agent, or Firm* — Schwegman Lundberg & Woessner, P.A.

(57) ABSTRACT

An apparatus, method, and computer-readable media are provided for reducing an energy consumption of hardware on which an application is running. In use, a call is received from an application via an application program interface. Such call indicates a state of the application. Further, an action is determined, based on the call. The action is for reducing an energy consumption of hardware on which the application is running. The method continues by executing the action for reducing the energy consumption of the hardware on which the application is running.

28 Claims, 9 Drawing Sheets

(56) References Cited

U.S. PATENT DOCUMENTS

| | | | |
|---|---|---|---|
| 2013/0290751 A1 | 10/2013 | Mondal et al. | |
| 2013/0316696 A1* | 11/2013 | Huang | H04W 52/0212 455/419 |
| 2014/0181471 A1* | 6/2014 | Juang | G06F 1/3206 712/30 |
| 2014/0281603 A1* | 9/2014 | Boucher | G06F 1/3206 713/320 |
| 2016/0116954 A1* | 4/2016 | Zhuang | G06F 1/26 713/300 |

OTHER PUBLICATIONS

Pandiyan et. al., "Performance, energy characterizations, and architectural implications of an emerging mobile platform benchmark suite—mobilebench," IEEE Internal Symposium on Workload Characterization, 2013, pp. 1-10.

Imes et al., "Poet: a portable approach to minimizing energy under soft real-time constraints," IEEE Real-Time and Embedded Technology and Applications Symposium, 2015, pp. 75-86.

Rao et al., "Application-Specific Performance-Aware Energy Optimization on Android Mobile Devices" 23rd IEEE Symposium on High Performance Computer Architecture (HPCA), 2017, pp. 1-12.

Microsoft, "About Power Management," Oct. 12, 2016, pp. 1-2, as retrieved by the Internet Archive Wayback Machine, https://msdn.microsoft.com/en-us/library/windows/desktop/aa372422(v=vs.85).aspx.

Microsoft, "Power Management Functions," Nov. 14, 2016, pp. 1-6, as retrieved by the Internet Archive Wayback Machine, https://msdn.microsoft.com/en-us/library/windows/desktop/aa373163(v=vs.85).aspx.

Texas Instruments, "DVFS User Guide," Aug. 9, 2016, pp. 1-2, as retrieved by the Internet Archive Wayback Machine, http://processors.wiki.ti.com/index.php/DVFS_User_Guide.

Schlachter, F., "No Moore's Law for batteries," Proc Natl Acad Sci U S A., Apr. 2, 2013, vol. 110, No. 14, pp. 1-2.

"European Application No. 18760898.9, Extended European Search Report dated Feb. 14, 2020", (dated Feb. 14, 2020), 8 pgs.

"International Application No. PCT/CN2018/077381, International Search Report and Written Opinion dated May 18, 2018", (dated May 18, 2018), 9 pgs.

* cited by examiner

APPARATUS AND METHOD FOR REDUCING AN ENERGY CONSUMPTION OF HARDWARE BASED ON AN APPLICATION STATE

FIELD

The present disclosure relates to energy consumption management, and more particularly to techniques for reducing energy consumption.

BACKGROUND

Over the years, numerous techniques have been proposed to improve the energy efficiency of mobile devices. One technique is referred to as dynamic voltage and frequency scaling (DVFS). Such circuit-level technique regulates power consumption by dynamically adjusting a voltage and/or frequency of a device. Driver-level software modules known as governors may, for example, monitor circuit-level factors such as processor load, and switch to a certain frequency and/or voltage when such load exceeds a threshold.

However, techniques, such as DVFS, are general-purpose system techniques that are based on a low-level indication of system state such as processor utilization. To this end, they are agnostic to application-level usage scenarios. Consequently, such techniques produce inferior results when running different applications. Thus, to date, there is no indication of application state information between an application and an underlying power management mechanism, resulting, at best, in less effective software control of techniques such as DVFS.

SUMMARY

An apparatus is provided for reducing an energy consumption of hardware based on a state of an application. The apparatus includes a non-transitory memory storing instructions, and one or more processors in communication with the non-transitory memory. The one or more processors execute the instructions to receive a call from an application via an application program interface. Such call indicates a state of the application. Further, an action is determined, based on the call. The action is for reducing an energy consumption of hardware on which the application is running. The one or more processors also use the instructions to execute the action for reducing the energy consumption of the hardware on which the application is running.

Further provided is a method for reducing an energy consumption of hardware based on a state of an application. In use, a call is received from an application via an application program interface. Such call indicates a state of the application. Further, an action is determined, based on the call. The action is for reducing an energy consumption of hardware on which the application is running. The method continues by executing the action for reducing the energy consumption of the hardware on which the application is running.

Still yet, a computer-readable media is provided for reducing an energy consumption of hardware based on a state of an application. Included is a non-transitory computer-readable media storing computer instructions, that when executed by one or more processors, cause the one or more processors to perform various steps. Specifically, a call is received from an application via an application program interface. Such call indicates a state of the application. Further, an action is determined, based on the call. The action is for reducing an energy consumption of hardware on which the application is running. The steps continue by executing the action for reducing the energy consumption of the hardware on which the application is running.

According to one aspect of the present disclosure, there is provided an embodiment where the call may indicate the state of the application, by identifying the state of the application.

Optionally, in any of the preceding aspects, another implementation of the aspect provides that the state of the application may indicate an initiation of an application activity.

Optionally, in any of the preceding aspects, another implementation of the aspect provides that the state of the application may indicate a cessation of an application activity.

Optionally, in any of the preceding aspects, another implementation of the aspect provides that the state may correspond with an application activity including: a screen scrolling activity, a web page loading activity, a video playing activity, a video recording activity, a game playing activity, a music playing activity, and/or a global positioning system activity.

Optionally, in any of the preceding aspects, another implementation of the aspect provides that the action may be determined at a layer that resides below an application layer where the application resides. As an option, the action is determined at an operating system layer and/or a driver layer.

Optionally, in any of the preceding aspects, another implementation of the aspect provides that the call may be translated into an inter process communication, for being sent to an energy manager to determine the action and execute the action.

Optionally, in any of the preceding aspects, another implementation of the aspect provides that the application may include additional code for sending the call, in response to a change in the state.

Optionally, in any of the preceding aspects, another implementation of the aspect provides that the action may be determined by: determining whether multiple actions are to be executed simultaneously at least in part; determining the action to be a first action if it is determined that the multiple actions are not to be executed simultaneously at least in part; and determining the action to be a second action if it is determined that the multiple actions are to be executed simultaneously at least in part. As an option, the multiple actions may be determined, based on different calls from the same application. As another option, the multiple actions may be determined, based on different calls from different applications.

Optionally, in any of the preceding aspects, another implementation of the aspect provides that it may be determined whether the application is running as a background process, and the action may be conditionally executed based on the determination whether the application is running as the background process.

Optionally, in any of the preceding aspects, another implementation of the aspect provides that the action may include setting a run-time attribute including a voltage, a frequency, and/or a bandwidth in connection with a central processor, a graphics processor, a memory, and/or a bus.

One or more of the foregoing features of the aforementioned processing device, method, or computer-readable media embodiments may result in a reduction of energy consumption that would otherwise be foregone in systems that lack such features. Specifically, by affording synergy between the hardware-level energy reduction actions and application states, such actions may more accurately reflect and accommodate specific application-level activity. Further, in various embodiments, such application state-driven actions may be controlled by a software and/or hardware layer separate from the application and below an associated application layer.

To this end, the energy consumption of the hardware may be dynamically adjusted by a central or pseudo-central module that is separate and independent from the application(s) which may be helpful, in some embodiments, for administering the energy reduction in connection with multiple applications running on the same hardware. As an additional option, the application(s) need only report changes in state without necessarily including logic for determining specific actions to be taken, determining ways for dealing with conflicting actions that may result from different calls from the same application and/or different applications. It should be noted that the aforementioned potential advantages are set forth for illustrative purposes only and should not be construed as limiting in any manner.

DETAILED DESCRIPTION

Figure 1:
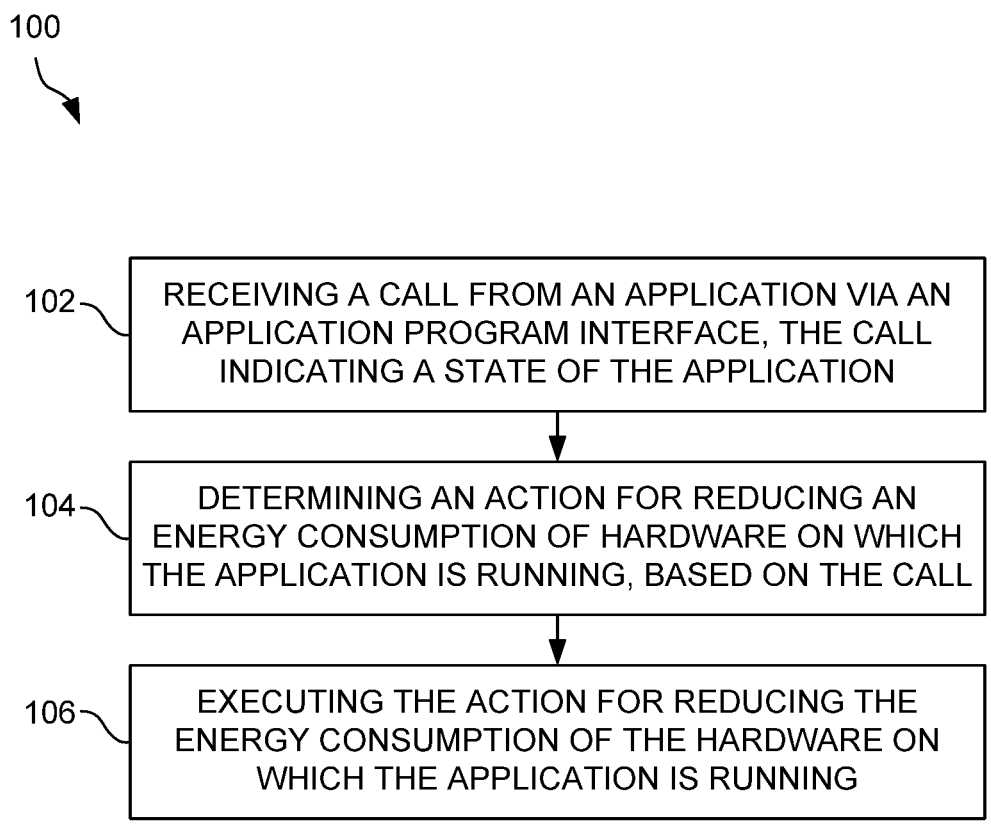
FIG. 1 illustrates a method for reducing an energy consumption of hardware on which an application is running, in accordance with an embodiment.

FIG. 1 illustrates a method 100 for reducing an energy consumption of hardware on which an application is running, in accordance with an embodiment. In the context of the present description, such hardware may include any one or more physical components that support an execution of the aforementioned application. For example, in various embodiments, such hardware may include, but is not limited to a processor (e.g. a central processor, a graphics processor, etc.), memory (e.g. volatile or non-volatile memory, etc.), a bus, input/output (I/O) (e.g. a network interface, a user I/O device, etc.).

Also in the context of the present description, the application may include any software, code, and/or instructions that is configured for being executed on the aforementioned hardware in order to perform one or more tasks. Non-limiting examples of such application may include a web browser, an office productivity program (e.g. word processor, spreadsheet generator, presentation program, etc.), a gaming application, etc. In still other embodiments, the foregoing application may be a component of a data structure (e.g. web page, document, presentation, etc.) that is capable of being processed by another application. In such embodiment, the application may include a script, mark-up language, etc. that is capable of performing one or more tasks in connection with the foregoing data structure. Even still, it should be noted that, in different embodiments, the foregoing application may include local software that resides exclusively on the hardware, and/or a remote software-based service that runs on remote hardware, as well as local hardware.

In any case, the method 100 serves to reduce an energy consumption of the hardware, based on input from the application. Specifically, with reference to FIG. 1, a call is received from the application via an application program interface (API), as indicated in operation 102. In the context of the present description, such API may refer to any one or more protocols, routines, instructions, and/or code segments that are configured to receive one or more calls from the application. For example, in one possible embodiment, the API may be implemented via one or more libraries. Further, the foregoing call may refer to any computer readable signal that may take any form (e.g. a command, a line of code, setting of a flag/register, etc.) and initiates or otherwise causes subsequent energy consumption reduction functionality. For example, in various embodiments, a call can be a function call, a method invocation, a message sent using inter-process communication (e.g. a message sent using a socket) or other suitable means invoking functionality.

In various embodiments, the application may be modified (e.g. by a developer or other entity before or after release, etc.) to include additional code for sending the call, in response to the state. This may be accomplished, for example, by inserting a snippet of code (e.g. a widget, etc.) in an already-existing application. Other embodiments are also contemplated where such code is inserted earlier (or even at a beginning) of an application development cycle. For example, in yet another embodiment, a compiler or other program may automatically incorporate the aforementioned additional code and/or appropriate calls into the application.

In one embodiment, the call indicates a state of the application. In the present description, such indication may include any explicit or implicit indicator of the application state. For example, in one embodiment, such indicator may identify the state (e.g. using a name of the state, using a code corresponding to the state, etc.). To this end, in various embodiments, the call may include a descriptor that directly identifies the state, or a code that enables a recipient of the call to identify, look-up, infer, or otherwise utilize the call to identify the application state.

In the context of the present description, the state may include any aspect of an execution and/or use of the application. For example, such execution and/or use may relate to application activity including, but not limited to a screen scrolling activity, a web page loading activity, a video playing activity, a video recording activity, a game playing activity, a music playing activity, a global positioning system activity, and/or any other activity capable of being conducted by or with the application. Still yet, the aforementioned aspect of the execution and/or use of the application may relate to an initiation (i.e. start), cessation (i.e. end), level, amount, and/or degree, etc. of the execution and/or use of the application.

With continuing reference to FIG. 1, an action is determined, in operation 104, for reducing the energy consumption of the hardware on which the application is running. Further, such action is determined based on the call. In the present description, the foregoing action may refer to any act that is capable being performed in connection with the hardware (e.g. processor, memory, bus, interface, other componentry, etc.) for the purpose of reducing the energy consumption (e.g. by reducing a voltage and/or current and a corresponding power) of the hardware. Further, such action may be determined by the hardware itself, other hardware, and/or software (e.g. an energy manager module, etc.). Still yet, in various embodiments, the action may optionally have other purposes, as well, such as avoiding significant performance loss while saving energy.

In various embodiments, the action may include setting at least one configurable aspect of the hardware. For example, such setting may involve a run-time attribute including, but not limited to a voltage, a frequency, and/or a bandwidth in connection with the hardware (e.g. processor, memory, bus, interface, other componentry, etc.). Specifically, in one possible embodiment, a kernel module (e.g. a governor) may be used to control an operating voltage and/or clock frequency of a processor by setting a particular operating parameter (e.g. cpufreq in Linux). In another possible embodiment, the aforementioned kernel module may be used to control a bandwidth of a bus and/or memory by setting another operating parameter (e.g. devfreq in Linux).

In use, the action may be determined in any desired manner that is a function of the call. For example, in one embodiment, the call and/or the associated application state may be used as a key to look up an appropriate action via a look up table. In another embodiment, the call and/or the associated application state may be input into a computer-implemented algorithm that uses logic and/or rules to output a corresponding action.

Operation 106 executes the action for reducing the energy consumption of the hardware on which the application is running. In the present description, such execution of the energy consumption reduction action may involve any implementation of the action after the determination thereof in operation 104. For example, in one possible embodiment, such execution may include the actual hardware-level setting of the voltage, frequency, and/or bandwidth of the relevant hardware, as a result of the associated parameter setting. In various embodiments, the operation 106 may or may not be carried out using the same hardware and/or software that carried out operation 104. Further, the action may be executed by the hardware itself, other hardware, and/or software (e.g. an energy manager module, etc.).

This may, in turn, result in a reduction of energy consumption that would otherwise be foregone in systems that lack such capability. Specifically, by affording synergy between the hardware-level energy reduction actions and application states, such actions may more accurately reflect and accommodate specific application-level activity. Further, in various embodiments, such application state-driven actions may be controlled by a software and/or hardware layer separate from the application and below an associated application layer.

To this end, the energy consumption of the hardware may be dynamically adjusted by a central or pseudo-central module that is separate and independent from the application(s) which may be helpful, in some embodiments, to administer the energy reduction in connection with multiple applications running on the same hardware. As an additional option, the application(s) need only report changes in state without necessarily including logic for determining specific actions to be taken, and determining ways for dealing with conflicting actions that may result from different calls from the same application and/or different applications. It should be noted that the aforementioned potential advantages are set forth for illustrative purposes only and should not be construed as limiting in any manner.

More illustrative information will now be set forth regarding various optional architectures and uses in which the foregoing method may or may not be implemented, per the desires of the user. Again, it should be noted that the following information is set forth for illustrative purposes and should not be construed as limiting in any manner. Any of the following features may be optionally incorporated with or without the other features described.

Figure 2:
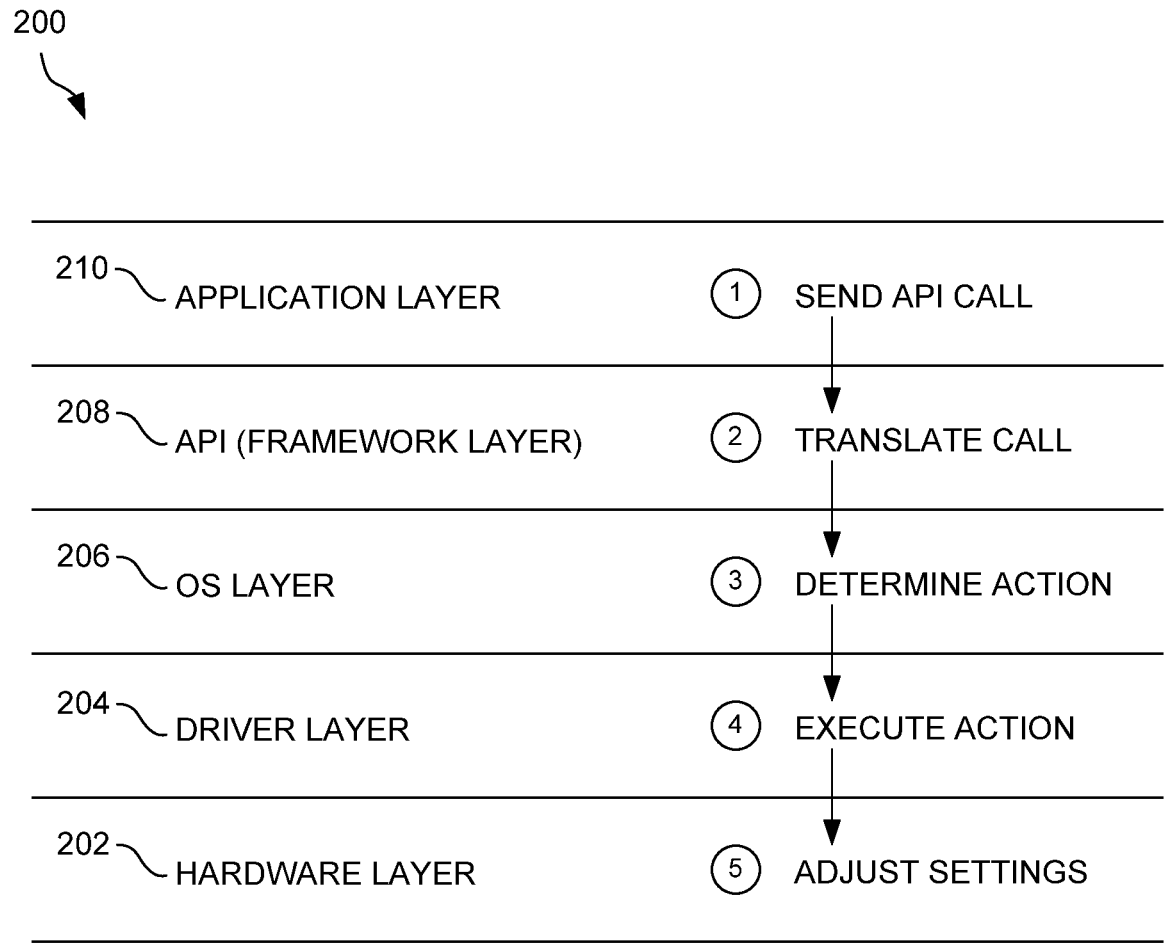
FIG. 2 illustrates a layer framework for reducing an energy consumption of hardware on which an application is running, in accordance with another embodiment.

FIG. 2 illustrates a layer framework 200 for reducing an energy consumption of hardware on which an application is running, in accordance with an embodiment. As an option, the layer framework 200 may be implemented in the context of any one or more of the embodiments set forth in any previous and/or subsequent figure(s) and/or the description thereof. However, it is to be appreciated that the layer framework 200 may be implemented in other suitable environments.

As shown, the layer framework 200 includes a hardware layer 202, a driver layer 204, an operating system (OS) layer 206, an API layer 208, and an application layer 210. Such hardware layer 202 may include any hardware (e.g. processor(s), memory, bus, I/O, etc.) with adjustable settings (e.g. voltage, frequency, etc.) that result in different energy consumptions. Further, the driver layer 204 may include one or more driver applications that are configured for controlling the aforementioned run-time attribute settings of the hardware.

Still yet, the OS layer 206 may include an OS on which the application runs, or one or more system-level applications. In any case, such OS layer 206 serves to determine, with possible support from the driver layer 204, an appropriate action for reducing hardware-level energy consumption based on application-level activity. So that the OS layer 206 may stay apprised of such application-level activity, the API layer 208 includes at least one API to channel calls between one or more applications of the application layer 210 and the OS layer 206.

In use, the one or more applications of the application layer 210 initiate one or more API calls and direct the same to the API(s) of the API layer 208, in response to various application-level activity. See operation 1. Thereafter, in operation 2, such call is translated by the API(s) of the API layer 208 into an inter process communication (IPC). In operation 3, such IPC is sent to one or more system-level applications or an OS of the OS layer 206 for determining an appropriate action configured to reduce energy consumption of the hardware of the hardware layer 202. Further, in operation 4, this is supported and accomplished by the driver(s) of the driver layer 204 being used to configure hardware settings by, for example, adjusting the corresponding hardware-level settings.

To this end, through the execution of the foregoing setting adjustments, the hardware of the hardware layer 202 operates with the adjusted settings in operation 5, thereby reducing energy consumption in coordination with specific application states driven by different application-level activities. By coordinating such application states with hardware-level energy reduction, energy savings may, in some embodiments, be increased (or even maximized) since it is such application-level activity that ultimately drives energy consumption.

Figure 3:
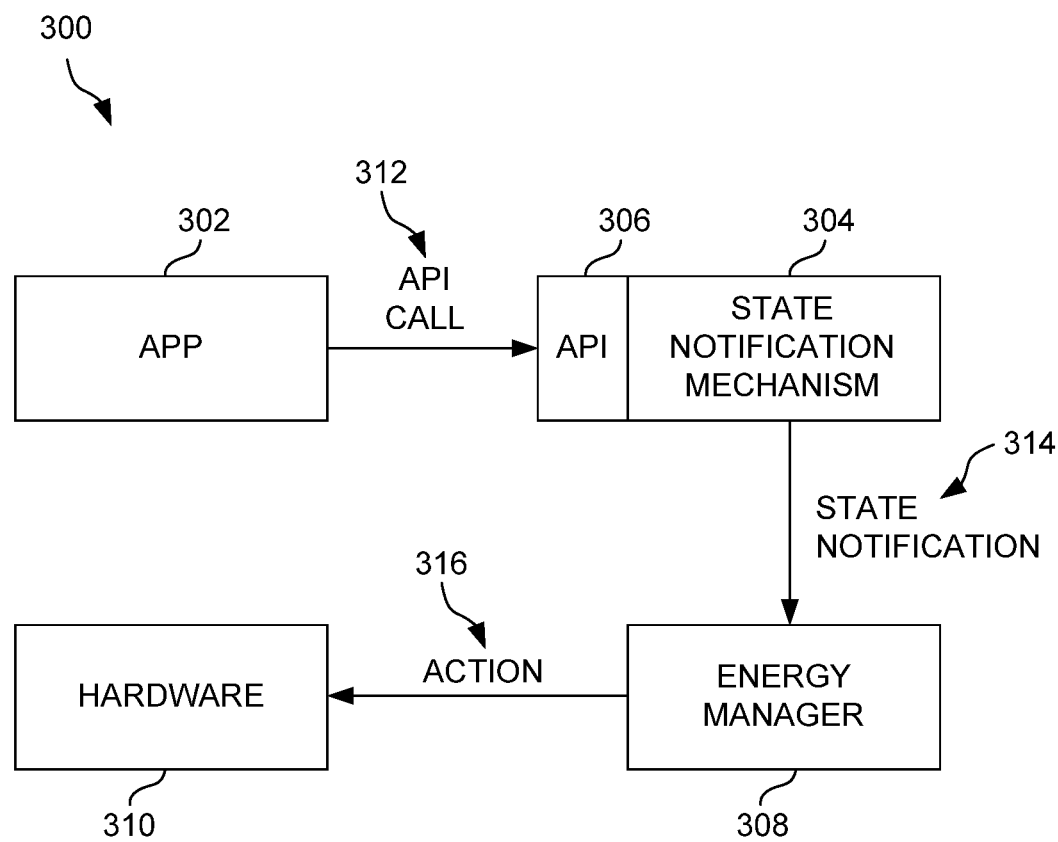
FIG. 3 illustrates a system for reducing an energy consumption of hardware on which an application is running, in accordance with yet another embodiment.

FIG. 3 illustrates a system 300 for reducing an energy consumption of hardware on which an application is running, in accordance with an embodiment. As an option, the system 300 may be implemented in the context of any one or more of the embodiments set forth in any previous and/or subsequent figure(s) and/or the description thereof. However, it is to be appreciated that the system 300 may be implemented in other suitable environments.

As shown, the system 300 includes an application 302, a state notification mechanism 304 equipped with an API 306, an energy manager 308, and hardware 310. In various embodiments, the notification mechanism 304 and the energy manager 308 may each include any combination of software and/or hardware capable of performing their intended tasks that will be elaborated upon below. Further, while the API 306 is shown to be a component of the state notification mechanism 304, other embodiments are contemplated where the API 306 is a separate entity or integrated with any other component of the system 300 (e.g. the energy manager 308, etc.). For that matter, any of the components of the system 300 may be integrated, in different embodiments.

Further, in one possible embodiment, the application 302 may be part of an application layer (e.g. the application layer 210 of FIG. 2), the API 306 may be part of an API or framework layer (e.g. the API layer 208 of FIG. 2), and the state notification mechanism 304 may be part of an OS layer (e.g. the OS layer 206 of FIG. 2). Still yet, the energy manager 308 may be part of a driver layer (e.g. the driver layer 204 of FIG. 2) and the hardware 310 may be part of a hardware layer (e.g. the hardware layer 202 of FIG. 2).

In use, the application 302 is modified (during or after development) with one or more lines of additional code (e.g. a snippet, module, etc.) whose purpose is to generate and send a call 312 to the API 306 of the state notification mechanism 304. See, for example, operation 102 of FIG. 1. For instance, in one embodiment, such one or more lines of code may be inserted after a command that, when executed, controls one or more activities of the application 302. In such possible embodiment, such inserted command may, in connection with the control of the application-level activity, sends the corresponding call 312 to the API 306 of the state notification mechanism 304.

In one embodiment, any aspect (e.g. format, contents, timing, etc.) of the call 312 may vary based on the specific application-level activity that is initiated, stopped, etc. For example, in one embodiment, a first call may be sent in response to a start of a particular application-level activity, and a different second call may be sent in response to a cessation of the particular application-level activity.

Further, in one possible embodiment, the call 312 may be activity agnostic. In other words, the call 312 may not necessarily be different for different application-level activities. In other embodiments, the call 312 may be different for different application-level activities, thus allowing the state notification mechanism 304 to differentiate between calls associated with different application-level activities. Again, the difference between such calls, if any, may have any desired dependence/correspondence with any aspect of the associated application-level activity.

For instance, a first call prompted in connection with a first application-level activity may include a first format or code that is unique to the first application-level activity. Similarly, a second call prompted in connection with a second application-level activity may include a second format or code that is unique to the second application-level activity. As one possibility, the call 312 may accomplish this by specifically identifying the corresponding application-level state (e.g. by naming an associated activity, etc.), as well as an indication of a specific status thereof (e.g. starting, stopping, degree, etc.). Even still, the call 312 may further identify the application, as well, in some optional embodiments.

Table 1 illustrates exemplary calls 312.

TABLE 1

Call_1: Start_Activity_1_of_Application_1
Call_2: Stop_Activity_1_of_Application_1
Call_3: Start_Activity_2_of_Application_1
Call_4: Stop_Activity_2_of_Application_1
Call_5: Start_Activity_3_of_Application_2
Call_6: Stop_Activity_3_of_Application_2

In response to the receipt of the call 312, the state notification mechanism 304 may translate the call 312 into an IPC that is sent to the energy manager 308 in the form of a state notification 314. In one embodiment, such translation may involve any process by which the call 312 is converted to the state notification 314, so that communications can be initiated between different processes operating in connection with different layers of a software framework (e.g. the framework 200 of FIG. 2). For example, in various embodiments, the call 312 may be translated such that the state notification 314 takes the form of a SOCKET, BINDER, and/or FIRE IPC.

To this end, the state notification 314 is sent to the energy manager 308 for determining an appropriate action that may be used to reduce power consumption of the hardware 310. See, for example, operation 104 of FIG. 1. To accomplish this, an action signal 316 is sent to the hardware 310. As mentioned earlier, the action signal 316 may take any form (e.g. the setting of a hardware operating parameter, etc.). By this design, operation of the hardware 310 may be adjusted to accommodate the application-level activity that prompted the call 312 for reducing an energy consumption of the hardware 310. See, for example, operation 106 of FIG. 1.

Figure 4:
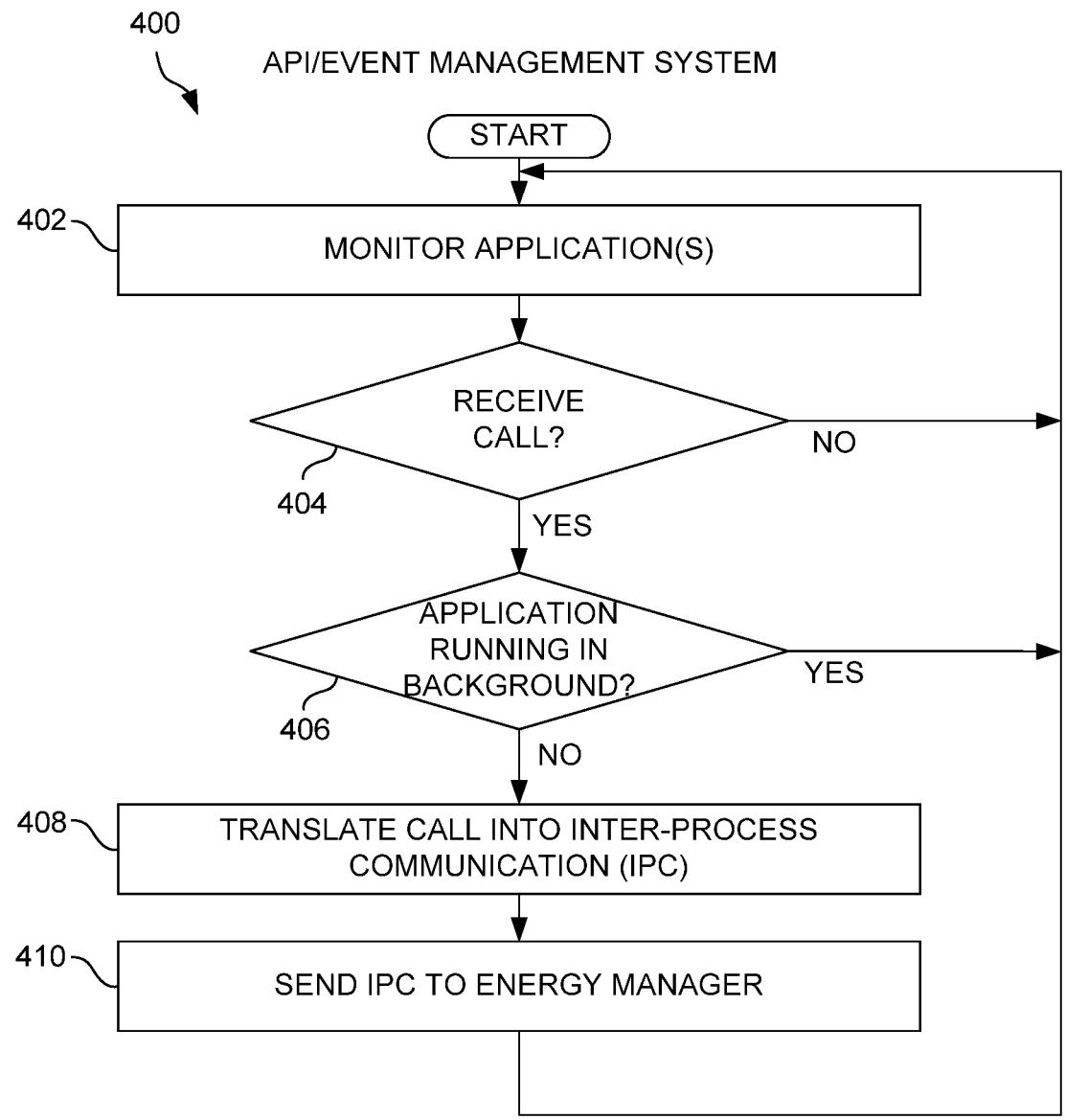
FIG. 4 illustrates a state notification mechanism/application program interface (API) method for reducing an energy consumption of hardware, in accordance with an embodiment.

FIG. 4 illustrates a state notification mechanism/API method 400 for reducing an energy consumption of hardware, in accordance with an embodiment. As an option, the method 400 may be implemented in the context of any one or more of the embodiments set forth in any previous and/or subsequent figure(s) and/or the description thereof. For example, the method 400 may be carried out by the OS layer 206 and/or the API layer 208 of FIG. 2, or the state notification mechanism 304 and/or the API 306 of FIG. 3. However, it is to be appreciated that the method 400 may be implemented in other suitable environments.

As shown, one or more applications (e.g. application 302 of FIG. 3) is monitored per operation 402. In one embodiment, this may involve being capable of receiving calls from the application(s). Specifically, an API (e.g. the API 306 of FIG. 3) may be installed for receiving the calls that are prompted by code that is installed as part of (or in addition to) the application(s) in response to changes in an application-level state. Through this, it is determined in decision 404 whether such a call is received.

If it is determined in decision 404 that a call is received via the API, it is then determined whether the application is running as a background process per decision 406. In the present description, such execution as a background process refers to a situation where the application is running, but a functionality of the application is not necessarily the subject of input focus (or other focus) in connection with a user of the application (e.g. the application is not operating in the foreground). In such situations, the initiation of any energy reduction measures may not necessarily be warranted (and thus be conditionally executed or even conditionally determined based on decisoin 406), since background processes are only rarely a source of energy overconsumption.

Thus, if the application is not running in the background per decision 406, the call is translated into an IPC in operation 408. For reasons that will soon become apparent, the call may, in various embodiments, either explicitly or implicitly identify a particular application state (e.g. usage scenario) that prompted the call to be generated and sent. In such case, the translation of operation 408 may be such that this state indication is maintained either in its original or a translated form, so that such information may be available for subsequent processes.

Further, such IPC is sent to an energy manager (e.g. the energy manager 308 of FIG. 3) in operation 410 for supporting the selection of an appropriate energy reduction action. To this end, the method 400 enables calls from an application layer (e.g. the application layer 210 of FIG. 2) to be communicated to lower layers (e.g. the OS layer 206 and the driver layer 204 of FIG. 2) for implementing energy reduction measures.

Figure 5:
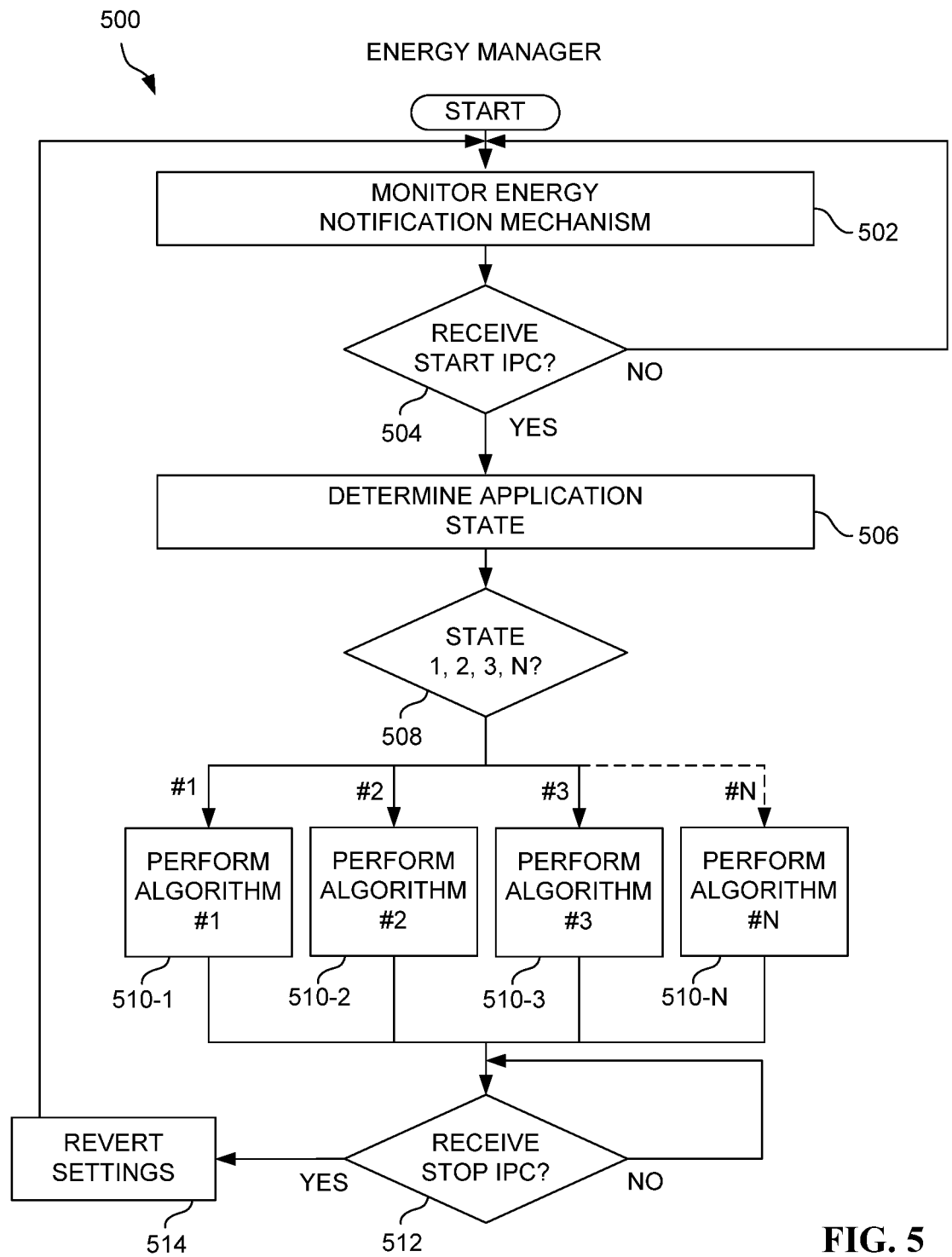
FIG. 5 illustrates an energy manager method for reducing an energy consumption of hardware, in accordance with another embodiment.

FIG. 5 illustrates an energy manager method 500 for reducing an energy consumption of hardware, in accordance with an embodiment. As an option, the method 500 may be implemented in the context of any one or more of the embodiments set forth in any previous and/or subsequent figure(s) and/or the description thereof. For example, the method 500 may be carried out by the driver layer 204 of FIG. 2 of FIG. 2, or the energy manager 308 of FIG. 3. However, it is to be appreciated that the method 500 may be implemented in other suitable environments.

As shown, a state notification mechanism (e.g. state notification mechanism 304 of FIG. 3) is monitored per operation 502. In one embodiment, this may involve being capable of receiving IPCs from the state notification mechanism. By this design, it is determined in decision 504 whether a start IPC is received at an energy manager (e.g. energy manager 308 of FIG. 3). As mentioned earlier, such start IPC may correlate with a start API call that was prompted by the start of a particular application-level activity, such that such start of activity constitutes an applicant level state change.

If so, a particular application state is determined in operation 506. This may be accomplished in any desired manner. For example, the IPC may include a command, parameter, or data that explicitly identifies the particular application state, or may include some other code or key that may be used to ascertain the same. Using such information, the specific state is determined in decision 508. In one embodiment, all possible specific states (that are able to generate a call) may be accounted for in any supporting data structure of the energy manager so that an appropriate corresponding algorithm may be initiated. Further, to the extent that an incoming state notification is not recognized, there may be one or more default algorithms to be triggered.

Thus, as shown in operations 510-1, 2, 3, N, the corresponding algorithm is performed so that a specific energy reduction action may be taken. As mentioned earlier, each algorithm and corresponding energy reduction action may involve a specific setting for a voltage level, clock frequency, and/or bandwidth in connection with a processor and/or other relevant hardware, that specifically accommodates a specific corresponding application state. For example, an operating voltage and/or clock frequency of a graphics processor may be augmented when an application is being used to display high-quality content to a user, and may be subsequently decreased when such content display ceases (and other non-graphics processing ensues, for instance). In another possible embodiment, a bandwidth of a bus and/or memory may be augmented when an application loads a long video from memory, and may be subsequently decreased when such loading is complete.

In some embodiments, one or more of the energy reduction actions may vary in connection with a magnitude (e.g. of a voltage, frequency, bandwidth, etc.) of a single or multiple hardware parameters. In other embodiments, one or more of the energy reduction actions may vary in connection with a type (e.g. voltage, frequency, bandwidth, etc.) of hardware parameter that is being set. In still additional embodiments, one or more of the energy reduction actions may vary in connection with the underlying hardware (e.g. processor, memory, bus, etc.) that is the subject of the associated settings. In even still additional embodiments, one or more of the energy reduction actions may vary in connection with any desired combination of the foregoing. More information regarding operations 510-1, 2, 3, N will be set forth during reference to FIG. 6A.

Since any energy reduction action may be needed or helpful only while the associated application-level activity persists, the method 500 may, in decision 512, be capable of monitoring the energy notification mechanism for a stop IPC that is indicative of a cessation of the application-level activity that was the subject of the start IPC received per decision 504. Upon receipt of such stop IPC, any change in settings that was made as a result of one of the operations 510-1, 2, 3, N is reverted (e.g. changed back to their previous settings), in operation 514. Thus, the energy reduction actions may be started and stopped in concert with the initiation and cessation of the corresponding application-level activity that drives the application state.

Figure 6A:
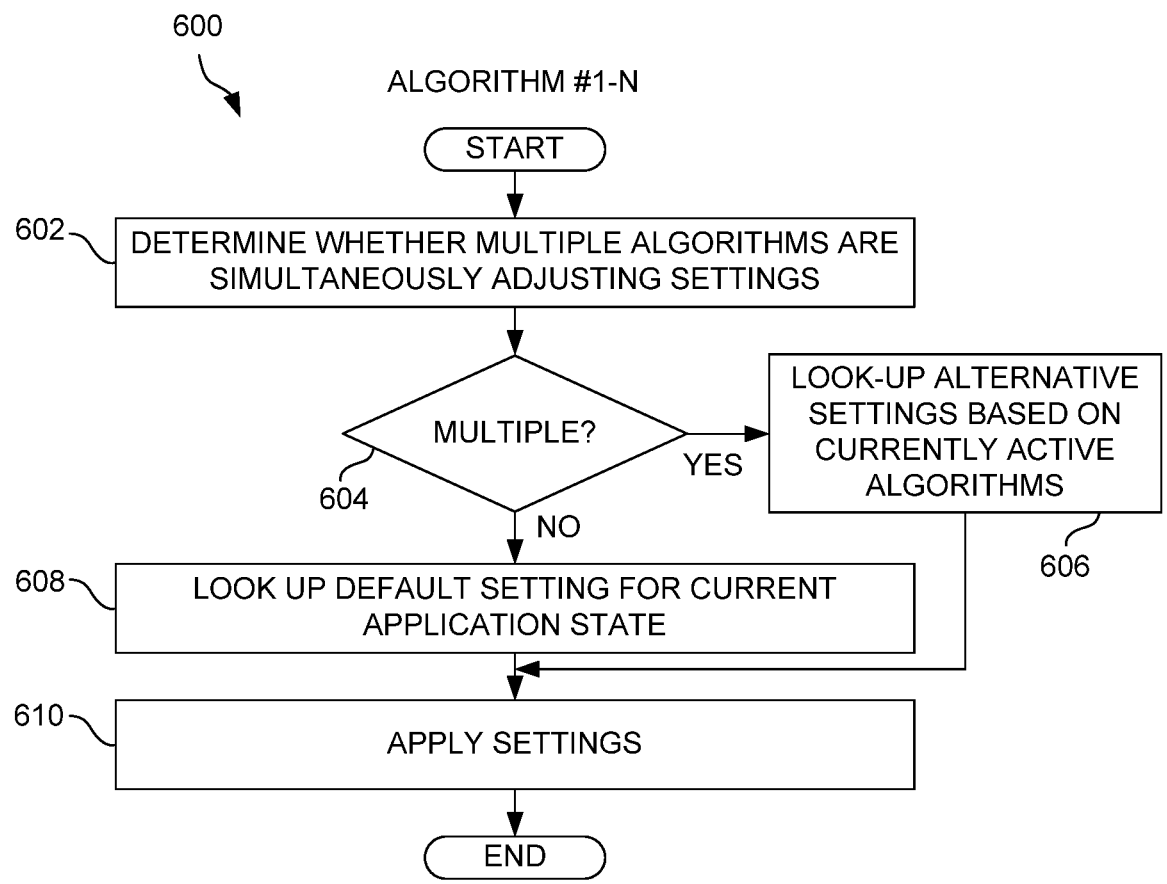
FIG. 6A illustrates a method for reducing an energy consumption of hardware in connection with situations where multiple application-level activities exist, in accordance with an embodiment.

FIG. 6A illustrates a method 600 for reducing an energy consumption of hardware in connection with situations where multiple application-level activities exist, in accordance with an embodiment. As an option, the method 600 may be implemented in the context of any one or more of the embodiments set forth in any previous and/or subsequent figure(s) and/or the description thereof. For example, the method 600 may be carried out by the OS layer 206 and/or driver layer 204 of FIG. 2, or the energy manager 308 of FIG. 3. Further, the method 600 may be carried out in the context of the operations 510-1, 2, 3, N of FIG. 5. However, it is to be appreciated that the method 600 may be implemented in other suitable environments.

The method 600 includes operation 602 which may be executed in connection with any energy reduction action (e.g. operations 510-1, 2, 3, N of FIG. 5). As shown in FIG. 6, operation 602 includes the determination as to whether multiple actions are to be executed simultaneously at least in part. Thus, the purpose of operation 602 is to ensure that any conflict between different actions are accommodated. For example, a first action may involve raising a voltage to a first value while a second action (that occurs simultaneously, at least in part) may involve raising the voltage to a second value.

It should be noted that, in some embodiments, the presence of multiple conflicting actions may result from state changes in (e.g. calls from) a single application (i.e. the same application). In other embodiments, the multiple conflicting actions may arise from changes in (e.g. calls from) different applications running on the same hardware.

Such situations may be ascertained per decision 604, so that alternative actions (e.g. settings) may be used that accommodate each and every one of the application-level activities that prompted the conflicting actions. Specifically, as shown, the action may be determined to be a first action in operation 608 if it is determined that the multiple actions are not to be executed simultaneously per decision 604. Further, the action may be determined to be a second action in operation 606, if it is determined that the multiple actions are to be executed simultaneously. In the context of the present description, such simultaneous execution may be concurrent for their full duration or simply concurrent only for a partial duration.

Thus, the method 600 applies the appropriate settings in operation 610. Further, as mentioned earlier in connection with operations 512-514 of FIG. 5, such settings may be set until they are reverted in connection with a cessation of the corresponding application-level activity. In one possible embodiment, the use of the alternate settings (per operation 606) may be limited to only an overlap (in time) when both conflicting actions have started, and neither has been stopped (see decisions 504 and 512 of FIG. 5). Further, operation 606 may also be contingent on the multiple identified actions (see operation 604) conflicting in some manner.

Figure 6B:
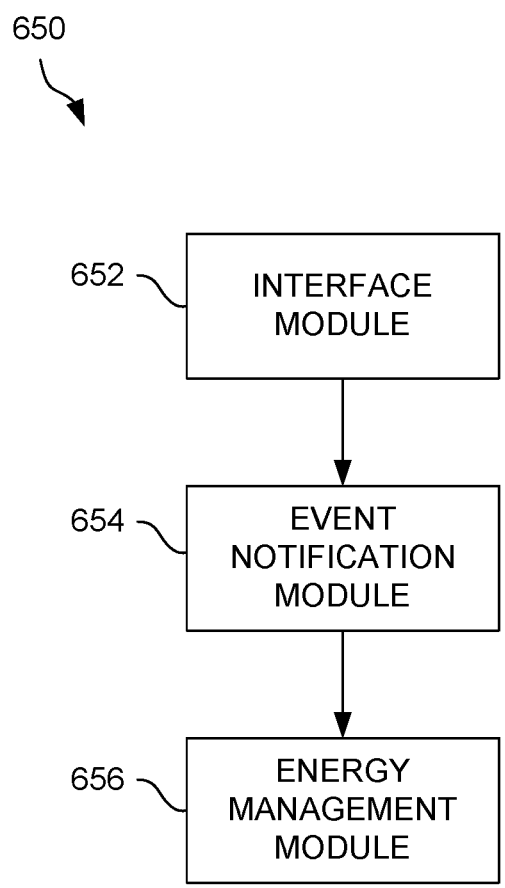
FIG. 6B illustrates a method for reducing an energy consumption of hardware on which an application is running, in accordance with still yet another embodiment.

FIG. 6B illustrates a system 650 for reducing an energy consumption of hardware on which an application is running, in accordance with an embodiment. As an option, the system 650 may be implemented with one or more features of any one or more of the embodiments set forth in any previous and/or subsequent figure(s) and/or the description thereof. However, it is to be appreciated that the system 650 may be implemented in other suitable environments.

As shown, an interface means in the form of an interface module 652 is provided for receiving a call from an application via an API, where the call indicates a state of the application (e.g. see operation 102 of FIG. 1). In various embodiments, the interface module 652 may include, but is not limited to the API 306 of FIG. 3, at least one processor (to be described later) and any software controlling the same, and/or any other circuitry capable of the aforementioned functionality.

Also included is an event notification means in the form of an event notification module 654 in communication with the interface module 652 for determining an action for reducing an energy consumption of hardware on which the application is running, based on the call (e.g. see operation 104 of FIG. 1). In various embodiments, the event notification module 654 may include, but is not limited to the event notification mechanism 306 of FIG. 3, at least one processor (to be described later) and any software controlling the same, and/or any other circuitry capable of the aforementioned functionality.

With continuing reference to FIG. 6B, energy management means in the form of an energy management module 656 is in communication with the event notification module 654 for executing the action for reducing the energy consumption of the hardware on which the application is running (e.g. see operation 106 of FIG. 1). In various embodiments, the energy management module 656 may include, but is not limited to the energy manager 308 of FIG. 3, at least one processor (to be described later) and any software controlling the same, and/or any other circuitry capable of the aforementioned functionality.

Figure 7:
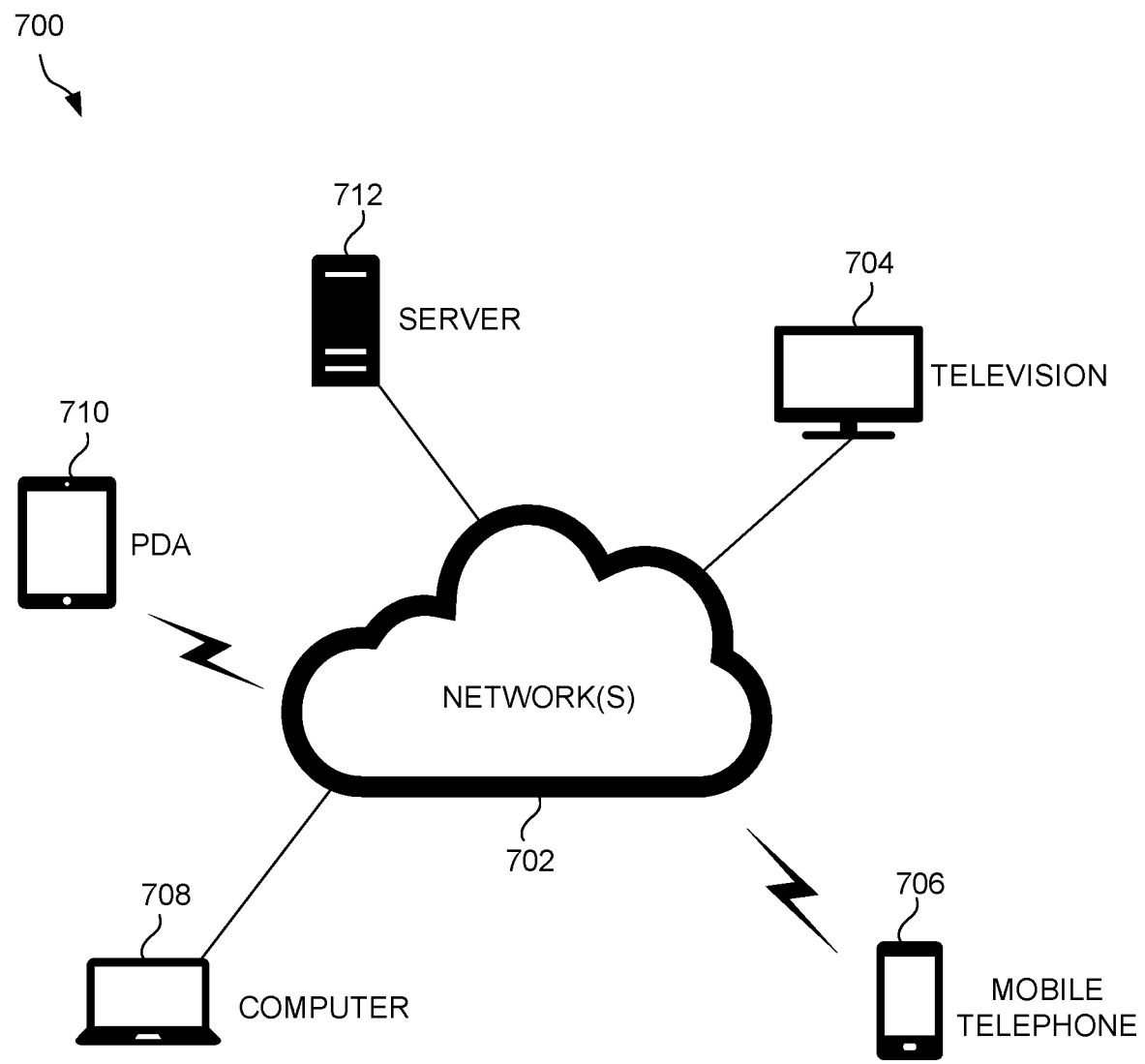
FIG. 7 is a diagram of a network architecture, in accordance with an embodiment.

FIG. 7 is a diagram of a network architecture 700, in accordance with an embodiment. As shown, at least one network 702 is provided. In various embodiments, any one or more components/features set forth during the description of any previous figure(s) may be implemented in connection with any one or more of the components of the at least one network 702.

In the context of the present network architecture 700, the network 702 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 702 may be provided.

Coupled to the network 702 is a plurality of devices. For example, a server 712 and a computer 708 may be coupled to the network 702 for communication purposes. Such computer 708 may include a desktop computer, lap-top computer, and/or any other type of logic. Still yet, various other devices may be coupled to the network 702 including a personal digital assistant (PDA) device 710, a mobile phone device 706, a television 704, etc.

Figure 8:
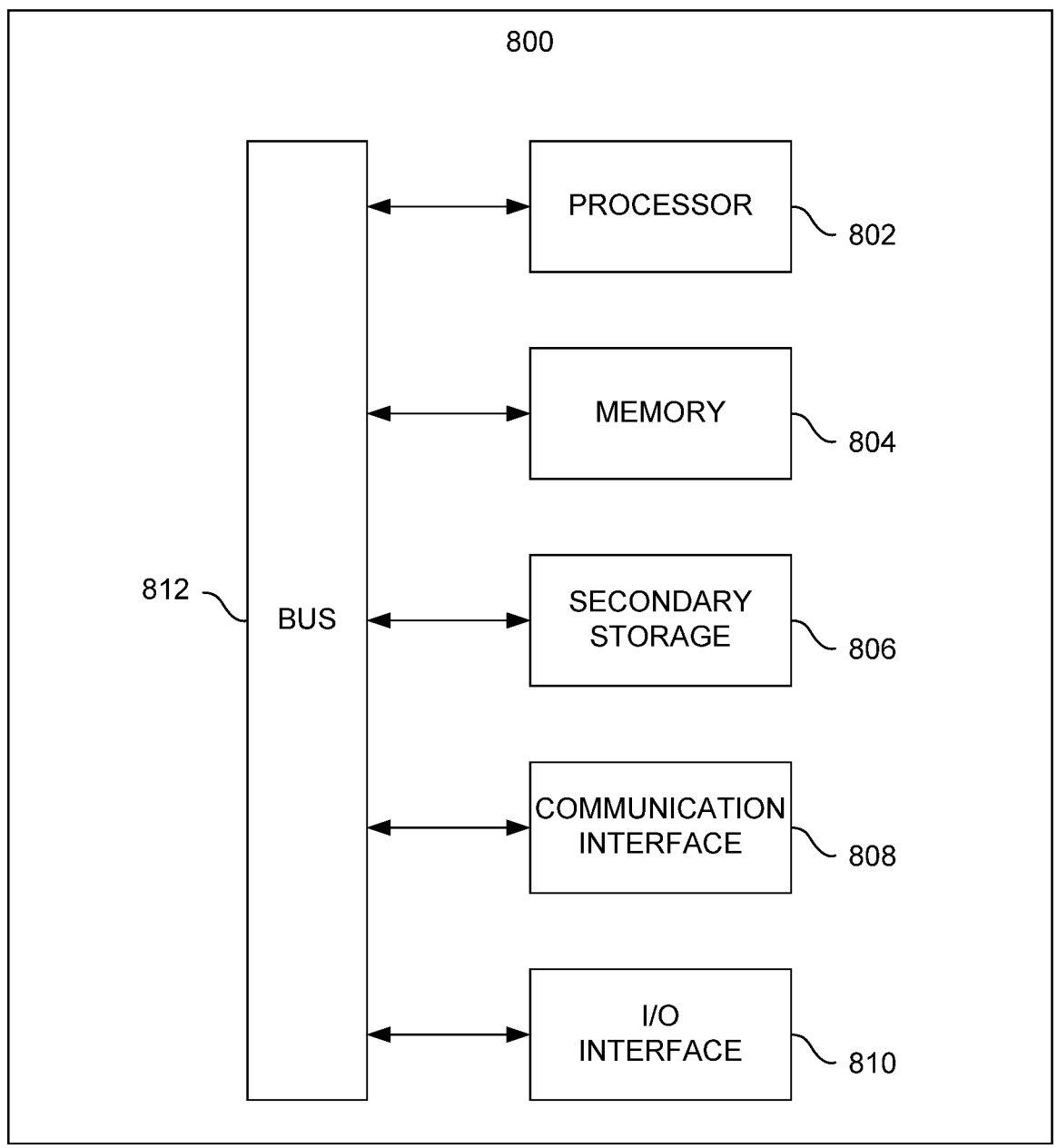
FIG. 8 is a diagram of an exemplary processing device, in accordance with an embodiment.

FIG. 8 is a diagram of an exemplary processing device 800, in accordance with an embodiment. As an option, the processing device 800 may be implemented in the context of any of the devices of the network architecture 700 of FIG. 7. However, it is to be appreciated that the processing device 800 may be implemented in any desired environment.

As shown, the processing device 800 includes at least one processor 802 which is connected to a bus 812. The processing device 800 also includes memory 804 [e.g., hard disk drive, solid state drive, random access memory (RAM), etc.] coupled to the bus 812. The memory 804 may include one or more memory components, and may even include different types of memory. Further included is a communication interface 808 (e.g. local/remote network interface, memory access interface, etc.) and an input/output (I/O) interface 810 (e.g. display, speaker, microphone, touch-screen, touchpad, mouse interface, etc.).

The processing device 800 may also include a secondary storage 806. The secondary storage 806 coupled to the bus 812 and/or to other components of the processing device 800. The secondary storage 806 can include, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the memory 804, the secondary storage 806, and/or any other memory, for that matter. Such computer programs, when executed, enable the processing device 800 to perform various functions (as set forth above, for example). Memory 804, secondary storage 806 and/or any other storage comprise non-transitory computer-readable media.

In one embodiment, the at least one processor 802 executes instructions in the memory 804 or in the secondary storage 806 to receive a call from an application via an API. Such call indicates a state of the application. Further, an action is determined, based on the call. The action is for reducing an energy consumption of hardware on which the application is running. The at least one processor 802 further executes the instructions to continue by executing the action for reducing the energy consumption of the hardware on which the application is running.

In some embodiments, the call may indicate the state of the application, by identifying the state of the application.

In some embodiments, the state of the application may indicate an initiation of an application activity.

In some embodiments, the state of the application may indicate a cessation of an application activity.

In some embodiments, the state may correspond with an application activity including: a screen scrolling activity, a web page loading activity, a video playing activity, a video recording activity, a game playing activity, a music playing activity, and/or a global positioning system activity.

In some embodiments, the action may be determined at a layer that resides below an application layer where the application resides. As an option, the action is determined at an operating system layer and/or a driver layer.

In some embodiments, the call may be translated into an inter process communication, for being sent to an energy manager to determine the action and execute the action.

In some embodiments, the application may include additional code for sending the call, in response to a change in the state.

In some embodiments, the action may be determined by: determining whether multiple actions are to be executed simultaneously at least in part; determining the action to be a first action if it is determined that the multiple actions are not to be executed simultaneously at least in part; and determining the action to be a second action if it is determined that the multiple actions are to be executed simultaneously at least in part. As an option, the multiple actions may be determined, based on different calls from the same application. As another option, the multiple actions may be determined, based on different calls from different applications.

In some embodiments, it may be determined whether the application is running as a background process, and the action may be conditionally executed based on the determination whether the application is running as the background process.

In some embodiments, the action may include setting a run-time attribute including a voltage, a frequency, and/or a bandwidth in connection with a central processor, a graphics processor, a memory, and/or a bus.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), or the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; or the like.

It should be understood that the arrangement of components illustrated in the Figures described are exemplary and that other arrangements are possible. It should also be understood that the various system components defined by the claims, described below, and illustrated in the various block diagrams represent logical components in some systems configured according to the subject matter disclosed herein.

For example, one or more of these system components may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the embodiments as claimed.

The computer-readable non-transitory media includes all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

The embodiments described herein include the one or more modes known to the inventor for carrying out the claimed subject matter. It is to be appreciated that variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A processing device, comprising:
   a non-transitory memory storing instructions; and
   one or more processors in communication with the non-transitory memory, wherein the one or more processors execute the instructions to:
      receive a call from an application executing on the one or more processors via an application program interface, the call indicating a current activity state of the application;
      determine an action for reducing an energy consumption of the one or more processors on which the application is running, based on the current activity state of the application indicated in the call from the application; and
      execute the action for reducing the energy consumption of the one or more processors on which the application is running.

2. The processing device of claim 1, wherein the call indicates the current activity state of the application by identifying a current activity of the application being executed on the one or more processors.

3. The processing device of claim 1, wherein the current activity state of the application indicates an initiation of an application activity.

4. The processing device of claim 1, wherein the current activity state of the application indicates a cessation of an application activity.

5. The processing device of claim 1, wherein the current activity state corresponds with an application activity including at least one of: a screen scrolling activity, a web page loading activity, a video playing activity, a video recording activity, a game playing activity, a music playing activity, or a global positioning system activity.

6. The processing device of claim 1, wherein the action is determined at a layer that resides below an application layer where the application resides.

7. The processing device of claim 1, wherein the action is determined at at least one of an operating system layer or a driver layer.

8. The processing device of claim 1, wherein the one or more processors execute the instructions to translate the call into an inter process communication, and send the inter process communication to an energy manager to determine the action and execute the action.

9. The processing device of claim 1, wherein the application includes additional code for sending the call, in response to a change in the current activity state.

10. The processing device of claim 1, wherein the action is determined by:
    determining whether multiple actions are to be executed simultaneously at least in part; determining the action to be a first action if it is determined that the multiple actions are not to be executed simultaneously at least in part; and determining the action to be a second action if it is determined that the multiple actions are to be executed simultaneously at least in part.

11. The processing device of claim 10, wherein the multiple actions are determined based on different calls from the same application.

12. The processing device of claim 10, wherein the multiple actions are determined, based on different calls from different applications.

13. The processing device of claim 1, wherein the one or more processors execute the instructions to:
    determine whether the application is running as a background process, wherein the action is conditionally executed based on the determination whether the application is running as the background process.

14. The processing device of claim 1, wherein the action includes setting a run-time attribute including at least one of a voltage, a frequency, or a bandwidth in connection with at least one of a central processor, a graphics processor, a memory, or a bus.

15. A computer-implemented method, comprising:
    receiving a call from an application, executing on one or more processors, via an application program interface, the call indicating a current activity state of the application;
    determining an action for reducing an energy consumption of the one or more processors on which the application is running, based on the current activity state of the application indicated in the call from the application; and executing the action for reducing the energy consumption of the one or more processors on which the application is running.

16. The method of claim 15, wherein the call indicates the current activity state of the application by identifying a current activity of the application being executed on the one or more processors.

17. The method of claim 15, wherein the current activity state of the application indicates an initiation of an application activity.

18. The method of claim 15, wherein the current activity state of the application indicates a cessation of an application activity.

19. The method of claim 15, wherein the current activity state corresponds with an application activity including at least one of:

a screen scrolling activity, a web page loading activity, a video playing activity, a video recording activity, a game playing activity, a music playing activity, or a global positioning system activity.

20. The method of claim 15, wherein the action is determined at a layer that resides below an application layer where the application resides.

21. The method of claim 15, wherein the action is determined at at least one of an operating system layer or a driver layer.

22. The method of claim 15, and further comprising:
translating the call into an inter process communication; and
sending the inter process communication to an energy manager to determine the action and execute the action.

23. The method of claim 15, wherein the application includes additional code for sending the call, in response to a change in the current activity state.

24. The method of claim 15, wherein the action is determined by:
determining whether multiple actions are to be executed simultaneously at least in part; determining the action to be a first action if it is determined that the multiple actions are not to be executed simultaneously at least in part; and determining the action to be a second action if it is determined that the multiple actions are to be executed simultaneously at least in part.

25. The method of claim 24, wherein the multiple actions are determined, based on different calls from the same application.

26. The method of claim 24, wherein the multiple actions are determined, based on different calls from different applications.

27. The method of claim 24, and further comprising:
determining whether the application is running as a background process, wherein the action is conditionally executed based on the determination whether the application is running as the background process.

28. A non-transitory computer-readable media storing computer instructions, that when executed by one or more processors, cause the one or more processors to perform the steps of:

receiving a call from an application, executing on the one or more processors, via an application program interface, the call indicating a current activity state of the application;

determining an action for reducing an energy consumption of the one or more processors on which the application is running, based on the current activity state of the application indicated in the call from the application; and executing the action for reducing the energy consumption of the one or more processors on which the application is running.

* * * * *